(12) United States Patent
Barth et al.

(10) Patent No.: US 8,452,252 B2
(45) Date of Patent: May 28, 2013

(54) LOW NOISE, LOW POWER SUBSAMPLING RECEIVER

(75) Inventors: Carsten Barth, Stanford, CA (US); Umran S. Inan, Stanford, CA (US); Ivan Richard Linscott, Mountain View, CA (US)

(73) Assignee: The Board of Trustees of the Leland Stanford Junior University, Palo Alto, CA (US)

( * ) Notice: Subject to any disclaimer, the term of this patent is extended or adjusted under 35 U.S.C. 154(b) by 391 days.

(21) Appl. No.: 12/790,174

(22) Filed: May 28, 2010

(65) Prior Publication Data

US 2010/0301928 A1  Dec. 2, 2010

Related U.S. Application Data

(60) Provisional application No. 61/181,917, filed on May 28, 2009.

(51) Int. Cl.
*H04B 1/10* (2006.01)
(52) U.S. Cl.
USPC ............ 455/307; 455/339; 455/323; 455/286
(58) Field of Classification Search
USPC ..................... 455/280, 286, 307, 339, 323
See application file for complete search history.

(56) References Cited

U.S. PATENT DOCUMENTS

| 4,866,442 A | * | 9/1989 | Steim et al. | 341/143 |
|---|---|---|---|---|
| 6,342,845 B1 | * | 1/2002 | Hilliard et al. | 340/941 |
| 7,558,556 B1 | | 7/2009 | Moloudi et al. | |
| 2005/0080564 A1 | * | 4/2005 | Tso et al. | 701/214 |
| 2005/0250467 A1 | * | 11/2005 | Contopanagos et al. | 455/339 |
| 2010/0099367 A1 | * | 4/2010 | Shamim et al. | 455/95 |

OTHER PUBLICATIONS

Devries, C., Subsampling Architecture for Low Power Receivers, journal, IEEE Transactions on Circuits and Systems—II: Express Briefs, Apr. 2008, pp. 304-308, vol. 55, No. 4, IEEE.
Kuhn, W., A 200 MHz CMOS Q-Enhanced LC Bandpass Filter, journal, IEEE Journal of Solid-State Circuits, Aug. 1996, pp. 1112-1122, vol. 31, No. 8, IEEE.
Lee, T., The Design of CMOS Radio-Frequency Integrated Circuits, book, 2004, pp. 713-714, 2nd edition, Cambridge University Press.
Pekau, H., A 0.18mm CMOS 2.1GHz Sub-sampling Receiver Front End with Fully Integrated Second- and Fourth-Order Q-Enhanced Filters, journal, 2007, pp. 3103-3106, IEEE.

* cited by examiner

*Primary Examiner* — Christian Hannon
(74) *Attorney, Agent, or Firm* — Evans & Molinelli PLLC; Eugene J. Molinelli (57) ABSTRACT

Techniques for a receiver includes a low noise amplifier, a Q-enhanced bandpass filter on a chip, and an analog to digital converter (ADC) at a sub-sampling speed suitable for an intermediate frequency (IF) signal. In some embodiments, a temperature compensation circuit is included. The receiver has an effective noise level less than 7 dB. In some embodiments a 1-bit ADC is used. In some of these embodiments, one or more switches in the ADC are inverted to cancel charge injection.

20 Claims, 9 Drawing Sheets

LOW NOISE, LOW POWER SUBSAMPLING RECEIVER

CROSS-REFERENCE TO RELATED APPLICATIONS

This application claims benefit of Provisional Appln. 61/181,917, filed May 28, 2009, the entire contents of which are hereby incorporated by reference as if fully set forth herein, under 35 U.S.C. §119(e).

BACKGROUND

The Global Positioning System (GPS) is a global navigation satellite system (GNSS) developed by the United States Department of Defense and is often used for commercial navigation purposes. GPS receivers determine their current location, the time, and their velocity based on radio frequency (RF) transmission from a constellation of satellites. GPS is also a required key synchronization resource of cellular networks, such as for the code division multiple access (CDMA) air interface protocol used by many wireless carriers in a multitude of countries.

GPS receivers can be grouped into two categories. The first group uses the traditional heterodyne receiver architecture, where the RF signal is converted down ("downconverted") to an intermediate frequency (IF) through mixing with a reference frequency (e.g., one at or near the nominal carrier frequency) before the analog to digital (A/D) conversion takes place. The second group digitally samples (digitizes) the RF signal directly, often at sample frequencies that have the same order of magnitude as the GPS carrier frequency. Both groups require a phase locked loop (PLL) and a locked oscillator (LO) that consume power. However, power might be limited in many applications, e.g., in integrated circuits and chips aboard satellites and other mobile devices.

In sub-sampling architectures, an RF signal is digitized at a frequency close to the much lower frequency of the information content changes rather than at the carrier frequency. Such architectures reduce power consumption of the above approaches because the PLL and LO can be omitted. However, as is well known, sub-sampling architectures have terrible noise figures (~30 decibels, dB). All noise throughout the receive band is aliased into the sub-sampled frequency band. This makes such architectures unsuitable for GNSS applications, in which a noise figure of less that 4 to 5 dB is typically desired.

SOME EXAMPLE EMBODIMENTS

GNSS receivers based on sub-sampling, that is sampling at a considerably lower frequency called an intermediate frequency (IF) compared to a carrier frequency, have never been implemented on a single RF CMOS integrated circuit; but only explored as off-chip architectures. One reason for this is the difficulty to achieve a sufficiently narrow and well controlled bandpass filter in RF CMOS. Such a bandpass is needed to prevent aliasing of noise in the folded frequencies as determined by the Nyquist principle.

Therefore, there is a need for a low-noise, low-power, on-chip GNSS receiver. According to one embodiment, a receiver includes a low noise amplifier, a Q-enhanced bandpass filter, and an analog to digital converter (ADC) at a sub-sampling speed suitable for the IF signal. The receiver has an effective noise level less than 7 dB. In some embodiments a 1-bit ADC is used. In some of these embodiments, one or more switches in the ADC are inverted to cancel charge injection.

According to another embodiment, a Q-enhanced CMOS bandpass filter comprises an inductor spiral on an integrated circuit, and a capacitor in parallel with the inductor spiral, and a negative resistance circuit disposed in parallel with the spiral inductor and capacitor.

Still other aspects, features, and advantages of the invention are readily apparent from the following description, simply by illustrating a number of particular embodiments and implementations, including the best mode contemplated for carrying out the invention. The invention is also capable of other and different embodiments, and its several details can be modified in various obvious respects, all without departing from the spirit and scope of the invention. Accordingly, the drawings and description are to be regarded as illustrative in nature, and not as restrictive.

BRIEF DESCRIPTION OF THE DRAWINGS

Embodiments of the invention are illustrated by way of example, and not by way of limitation, in the figures, in which.

DETAILED DESCRIPTION OF EXAMPLE EMBODIMENTS

A method and apparatus are disclosed for low noise, low power GNSS receivers suitable for implementation on a chip. In the following description, for the purposes of explanation, numerous specific details are set forth in order to provide a thorough understanding of the embodiments of the invention. It is apparent, however, to one skilled in the art that the embodiments of the invention may be practiced without these specific details or with an equivalent arrangement. In other instances, well-known structures and devices are shown in block diagram form in order to avoid unnecessarily obscuring the embodiments of the invention.

Although several embodiments of the invention are discussed with respect to GNSS, embodiments of the invention are not limited to this context. It is explicitly anticipated that similar receivers can be used in other applications in which a noise level less than about 7 dB is advantageous or enabling. For example, other applications include wireless wide area network (WWAN), wireless local area network (WLAN) or wireless personal area network (WPAN) applications and other communication systems that require narrowband down-conversion. In some embodiments, the Q-enhanced bandpass filter is used independently of the other receiver components.

One embodiment for a GNSS receiver with a noise level of less than 4 dB is described below. This is suitable for GNSS applications unlike the devices described by Holly Pekau and James W. Haslett, "A 0.18 mm CMOS 2.1 GHz Sub-sampling Receiver Front End with fully Integrated Second- and Fourth-Order Q-Enhanced Filters," IEEE 1-4244-0921-7/07, IEEE, New York, July 2007, p 3103-3106, (hereinafter Pekau); or the devices described by Christopher DeVries and Ralph Mason, "Subsampling Architecture for Low Power Receivers," IEEE 1549-7747, IEEE Transactions on circuits and Systems-II—Express Briefs, Vol. 55, No. 4, April 2008 (hereinafter DeVries). Pekau showed a noise figure of 7.14 dB; and DeVries showed a noise figure of 8 dB. However, the Pekau reference describes a 900 MHz sub-sampling receiver for a different application that can tolerate the higher noise factor and showed only simulation results of a noise figure of 7.13 dB, but did not show actual measurements of that noise figure. Unlike Pekau and DeVries, which use several Q-enhanced bandpass filters in their architecture, the illustrated embodiment requires only one Q-enhanced bandpass filter. Furthermore, the GPS/GNSS application requires a higher total conversion gain of over 100 dB or higher, which is achieved in an illustrated embodiment by adding one or more additional gain stages between the LNA and Q-enhanced bandpass filter and also between the Q-enhanced bandpass filter and the 1-bit ADC. Improved noise level may come from different tuning of the Q-enhanced filter, choice of the sub-sampling frequency, and the different architectural arrangement, as well as other design choices.

More details of particular embodiments are given below. The terms and expressions used herein have the meanings provided in Table 1.

TABLE 1

The terms and abbreviations used herein

| Expression | Meaning |
| --- | --- |
| bit | binary digit |
| CMOS | complementary metal-oxide-semiconductor |
| decibel (dB) | magnitude of a physical quantity (usually power, P, or intensity, I) relative to a specified or implied reference (Pref or Iref), e.g., P in dB = 10 log(P/Pref) |
| $g_m$ | the effective transconductance of a amplifier stage, equal to the Iout/Vin |
| Gm-C | Gm = transconductance, C = capacitance |
| GPS | Global Positioning System |
| IF | Intermediate frequency refers to a RF substantially lower than the RF of a carrier wave |
| L1 GPS | 1575.42 MegaHz |
| L5 GPS | 1176.45 MegaHz |
| LNA | Low Noise Amplifier |
| M1, M2, M3, M4 | Switches used in a 1-bit analog to digital converter |
| milliWatts (mW) | $10^{-3}$ Watts, where a Watt is a unit of work per unit time (power) equal to one joule per second in the System International (SI) system |
| MOS | metal-oxide-semiconductor |
| Noise Figure (NF) | The ratio of the input Signal to Noise Ratio (SNRin) to the output Signal to Noise Ratio (SNRout). In decibels (dB) this is NF = 10 log (SNRin/SNRout), or if SNR is in dB already. NF = SNRin, dB – SNRout, dB |

TABLE 1-continued

The terms and abbreviations used herein

| Expression | Meaning |
| --- | --- |
| picoFarad (pF) | $10^{-12}$ Farad, where a Farad is the System International (SI) unit for electrical capacitance and is equivalent to one coulomb of electrical charge per volt of electrical potential difference between two charged plates. |
| Q-enhanced | Inductors implemented as spirals on a semiconductor chip act as a finite inductor Q. To obtain a highly selective LC circuit, some Q enhancement is desired. A circuit, such as a filter circuit or tuner, with such an enhancement is said to be Q-enhanced. |
| RF | Radio frequency, refers to any part of electromagnetic wave band from 3 Hz to 300 GigaHertz |
| varactor | A varactor diode, which is a type of diode which has a variable capacitance that is a function of the voltage impressed on its terminals |

One purpose of the illustrated embodiment is as a sub-sampling Global Navigation Satellite System (GNSS) receiver front-end to perform down-conversion of incoming GPS, Galileo or Compass RF signals to an IF signal, and supply digital samples to the Digital Signal Processing (DSP) unit. The chip for GPS, Galileo, Glonass (GNSS) applications uses higher sampling frequencies and enables multiple signals (such as GPS L1 and L2) to be captured by aliasing them into baseband at the same time. Higher sampling frequencies also bring down the noise figure.

Figure 1A:
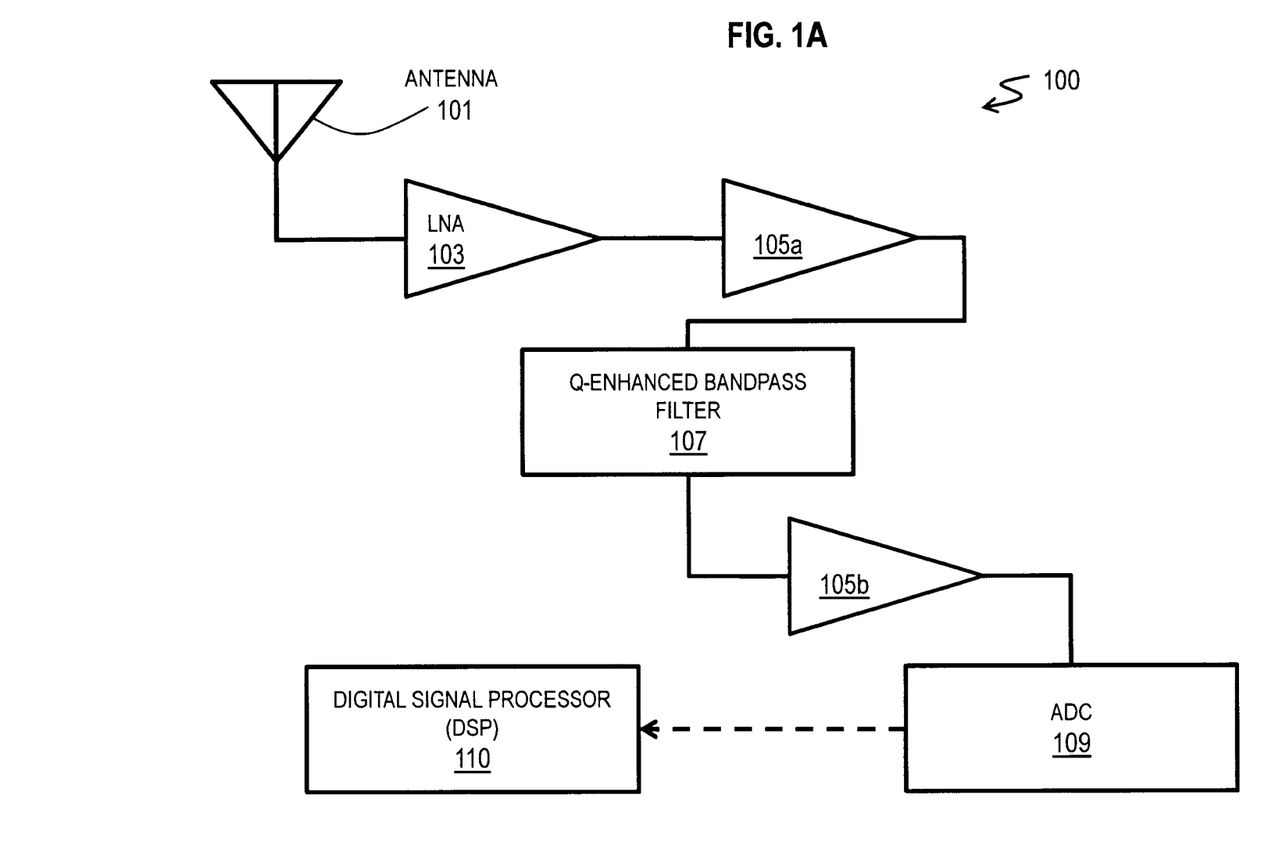
FIG. 1A is a diagram of a receiver suitable for implementation on a chip in a GNSS application, according to one embodiment.

The incoming RF signal is aliased to an IF frequency by sampling the RF signal at a considerably lower frequency than required by the Nyquist Theorem to sample the carrier frequency. To compensate, the signal is band passed to reduce the aliased noise before sampling with an ADC. FIG. 1A is a diagram of a receiver 100 suitable for implementation on a chip in a GNSS application, according to one embodiment.

The main components of the sub-sampling GNSS receiver 100 are (1) a source degenerated low-noise amplifier (LNA) 103, (2) a Q-enhanced bandpass filter 107 (that reduces energy in the frequencies that will be aliased into the band of interest as a result of sub-sampling), and (3) an analog-to-digital converter (ADC) 109. The apparatus also includes an antenna 101. Thus, in some embodiments, a receiver includes a low noise amplifier for a radio frequency signal that includes a carrier wave at a carrier wave frequency; an analog to digital converter (ADC) for a sampling frequency that is much less than the carrier wave frequency; and a Q-enhanced CMOS bandpass filter that substantively blocks frequencies above half the sampling frequency. The Q-enhanced CMOS bandpass filter is disposed between the low noise amplifier and the ADC.

In some embodiments, one or more optional amplifiers 105a and 105b (collectively referenced hereinafter as optional amplifiers 105) are included. The digital output, indicated by a dashed line is further processed at a digital system, such as a digital signal processor (DSP) 110 depicted. In some embodiments, the amplifier 105b serves as a limiting amplifier. A limiting amplifier limits the output voltage to a certain voltage range, to avoid saturation of the output stage or to protect a load device with a restricted input voltage range.

After the antenna 101, the incoming RF signal is low noise amplified in LNA 103, filtered in Q-enhanced bandpass filter 107 and then quantized by ADC 109, such as 1-bit ADC.

For some GNSS embodiments, the LNA 103 provides a 50 Ohm match at its input to avoid reflection. The gain of the LNA 103 is in the range 20 dB to 40 dB and its Noise Figure (NF) no more than 1.5 dB. The Q-enhanced bandpass filter 107 provides a narrow passband response to filter out unwanted noise that will alias into the IF band. To achieve such a narrowband response, very high Q-resonators are required, which are typically not available in CMOS RF circuits. Therefore, an active implementation based on negative resistance cancellation is implemented. A high-speed, 1-bit ADC 109 completes the design serving as bridge between the analog and the digital part. A clock is applied to the chip by an external oscillator, and allows the sampling frequency of the ADC 109 to be between 25-250 MegaHz (MHz, 1 MHz=$10^6$ samples per second). The bandwidth and the resonance frequency of the bandpass filter can be selected independently. Therefore, input signals in the range 1 to 2 GigaHz (GHz, 1 GHz=$10^9$ samples per second) can be down-converted through aliasing at the ADC 109 and processed by the DSP 110.

For the Q-enhanced bandpass filter 107, the active implementation is based on negative resistance cancellation, where the quality factor Q is enhanced by a reduction of any parasitic resistance of the on-chip spiral inductors. The parasitic resistance can be reduced by placing a negative resistance in parallel with a tuning circuit. The negative resistance is created by active circuitry, in most cases by a cross-coupled transistor pair as described below with reference to FIG. 4. In an implemented embodiment, a cross-coupled transistor pair is used for the Q-enhanced bandpass filter.

Advantages of the illustrated embodiment are: lower power consumption; simpler design architecture; lower costs and faster development time; and the ability to capture multiple frequencies simultaneously without significant increase of hardware complexity.

In various other embodiments, multiple Q-enhanced bandpass filters are used in parallel to capture multiple signals simultaneously, or 2-bit or multi-bit ADCs are used instead of 1-bit ADC; or a variable gain amplifier (VGA) is used as amplifier 105*b* instead of a limiting amplifier; or an on-chip oscillator is used instead of an external oscillator; or different LNA 103 or bandpass filter 107 architecture is used; or, automatic digital tuning is used, alone or in any combination. In the following figures a particular embodiment is described that achieves a noise floor of less than 2 dB.

Figure 1B:
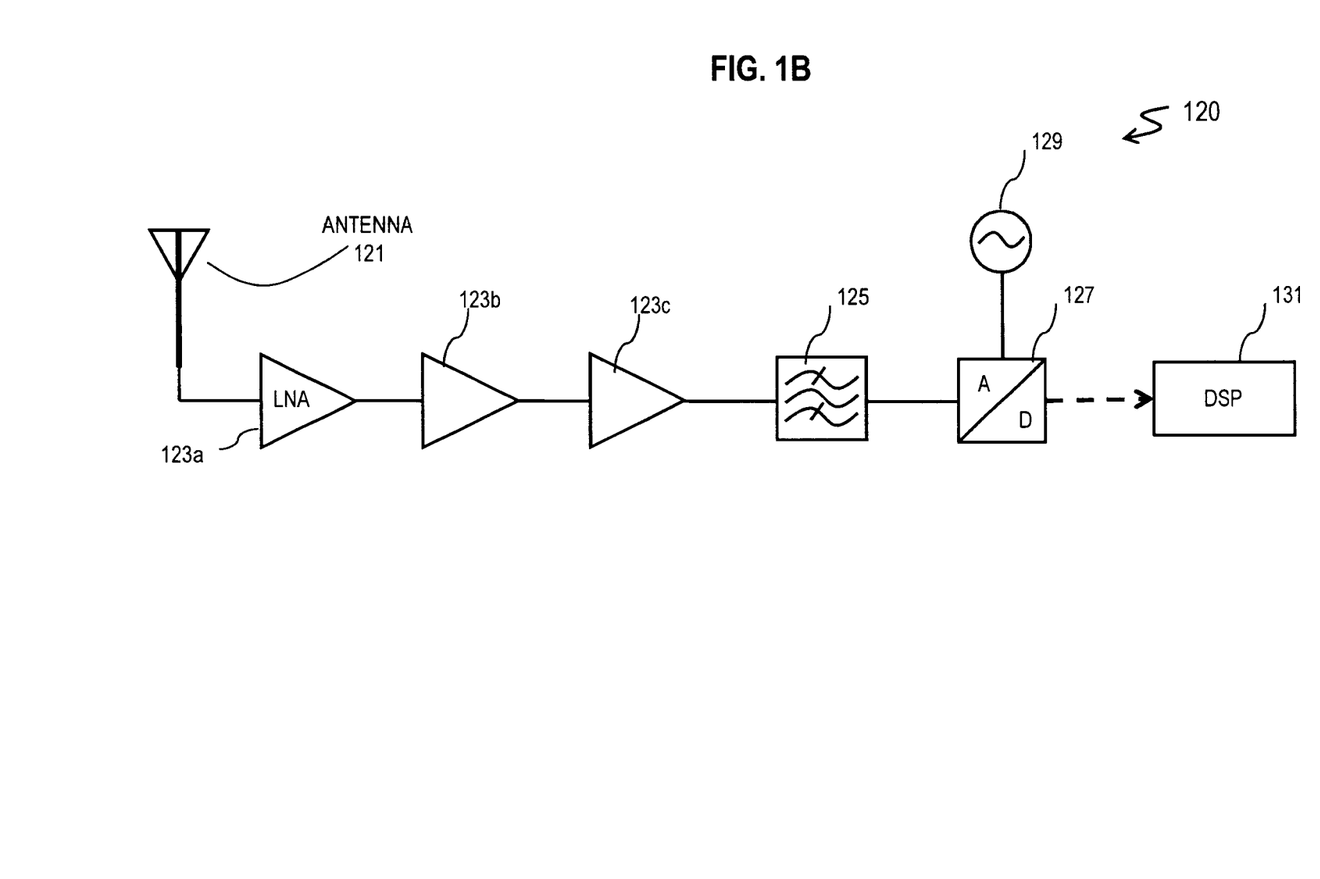
FIG. 1B is a diagram of a receiver suitable for implementation on a chip in a GNSS application, according to one embodiment.

FIG. 1B is a diagram of a receiver 120 suitable for implementation on a chip in a GNSS application, according to one embodiment. The main components of the proposed architecture by way example are as follows: the GPS antenna 121, a low noise amplification stage comprising one or more low-noise amplifiers (LNAs) 123*a*-123*c* (collectively referenced hereinafter as LNA stage 123), a Q-enhanced bandpass filter 125, a 1 bit analog to digital converter, ADC, (comparator) 127, an oscillator 129 which sets the sampling frequency of the ADC 127 and a digital signal processing (DSP) unit 131. Several components such as a single-ended to differential conversion circuit have been omitted for clarity. The DSP unit 131 is also shown for completeness but is not considered further.

In various embodiments, the GPS/GNSS Receiver architecture is fabricated in a standard 250 nm BiCMOS process or a 130 nm BiCMOS process from National Semiconductor. For better comparison with existing GPS receiver front-end architectures, bipolar transistors are not used in the architecture.

The GPS signal is assumed to be configured according to existing commercial standards such as a GPS L1 carrier frequency of 1.57542 GHz modulated with a course Acquisition (C/A) code currently being used by most commercial GPS receivers. The GPS satellites also broadcast at a second GPS L5 carrier frequency of 1.17645 GHz. The antenna 121 receives the GPS signal. The next stage is the low-noise amplification stage, which can include one or more low-noise amplifiers (LNA) 123*a*-*c*. In one embodiment, the LNA stage 123 was designed to have a Noise Figure 2-3 dB and a gain of 30-40 dB. The output of the LNA stage 123 is then fed to a Q-enhanced bandpass filter 125.

In various other embodiments, the gain of the LNA stage 123 is in the range from about 30 dB to about 35 dB and its Noise Figure (NF) no more than 3 dB. The Q-enhanced bandpass filter 125 provides a very narrowband passband response to filter out any unwanted noise that will alias into the IF passband through sub-sampling. To achieve such a narrowband response, very high Q-resonators are implemented, which are typically not available in CMOS RF circuits. Therefore, an active implementation based on negative resistance cancellation is employed. A high-speed, 1-bit ADC 127 completes the apparatus, serving as a bridge between the analog and the digital part. The clock is applied to the chip by an external oscillator 129, allowing the frequency to vary between about 0 to about 250 MHz. Due to the possibility of independent tuning of the Q and the resonance frequency of the bandpass filter 125 as well as the frequency of the external oscillator 129 a variety of signals in the range from about 1 GHz to about 2 GHz can be down converted by the receiver 120 and processed by the DSP 131.

One advantage of the sub-sampling GPS/GNSS receiver 120 embodiment, compared to heterodyne architectures, is the simplicity of the circuit and the lower power consumption. This advantage arises because a Phased Locked Loop (PLL) can be omitted. Another advantage is that multiple RF frequencies can be aliased into the same IF passband, thus allowing several GPS/GNSS signals to be monitored at the same time by the DSP 131.

Figure 1C:
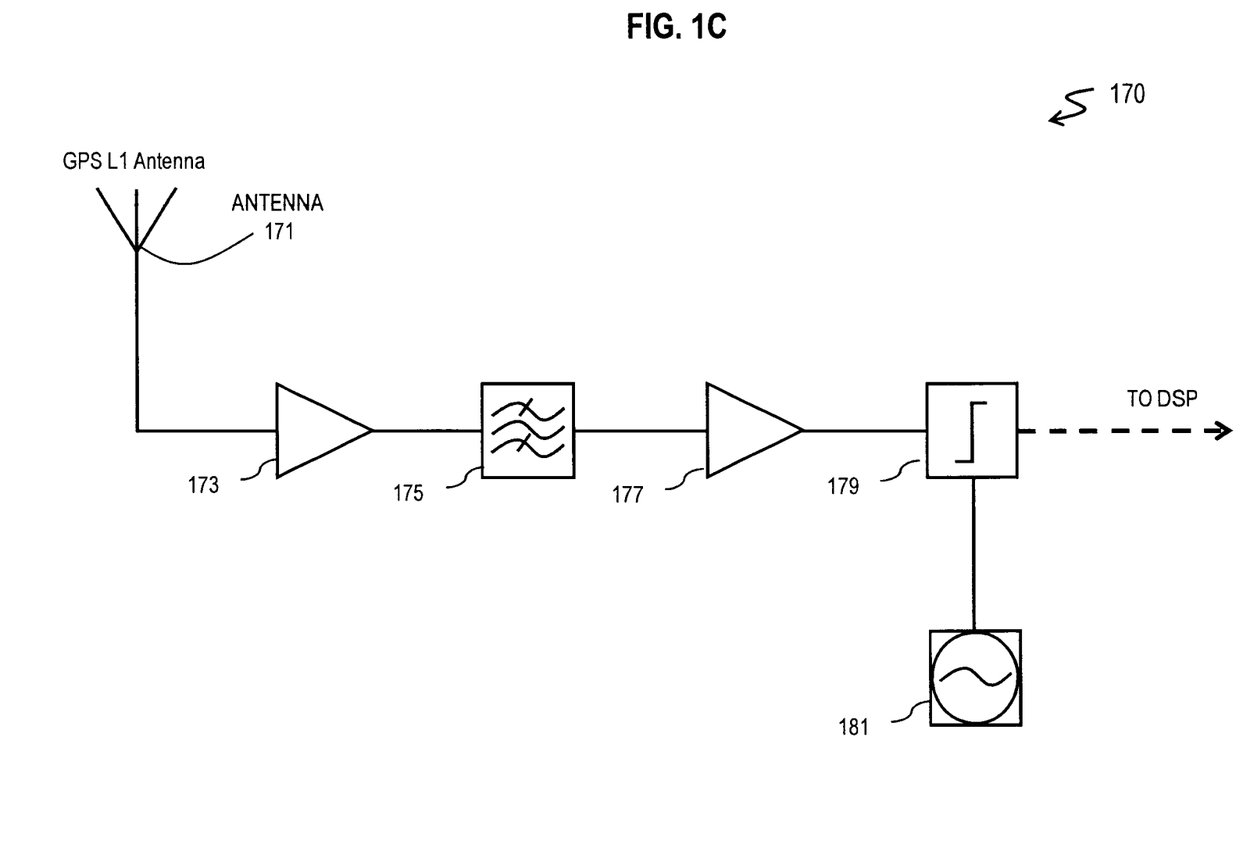
FIG. 1C is a diagram of a receiver with lower noise suitable for implementation on a chip in a GNSS application, according to another embodiment.

FIG. 1C is a diagram of a receiver 170 with lower noise suitable for implementation on a chip in a GNSS application, according to another embodiment. The signal received from antenna 171 is fed to an LNA 173 with gain 30 dB and Noise Figure smaller than 1.5 dB. The low-noise amplified signal is then passed through a bandpass Q-enhanced filter 175. In this embodiment the $2^{nd}$ order Q-enhanced filter has a gain of 20 dB, center frequency of 1.5742 GHz, and bandwidth of 20 MHz. The bandpass and noise-removed signal is then is fed to a limiting amplifier 177 with gain between 40 to 55 dB. The output of amplifier 177 is fed to the 1-Bit analog to digital convertor (comparator) 179. The sampling frequency for the ADC 179 is set by an off-chip oscillator 181 which has a range of frequency from about 25 MHz to 250 MHz. The digitized output is then fed to a DSP unit (not shown) such as DSP 131.

Figure 1D:
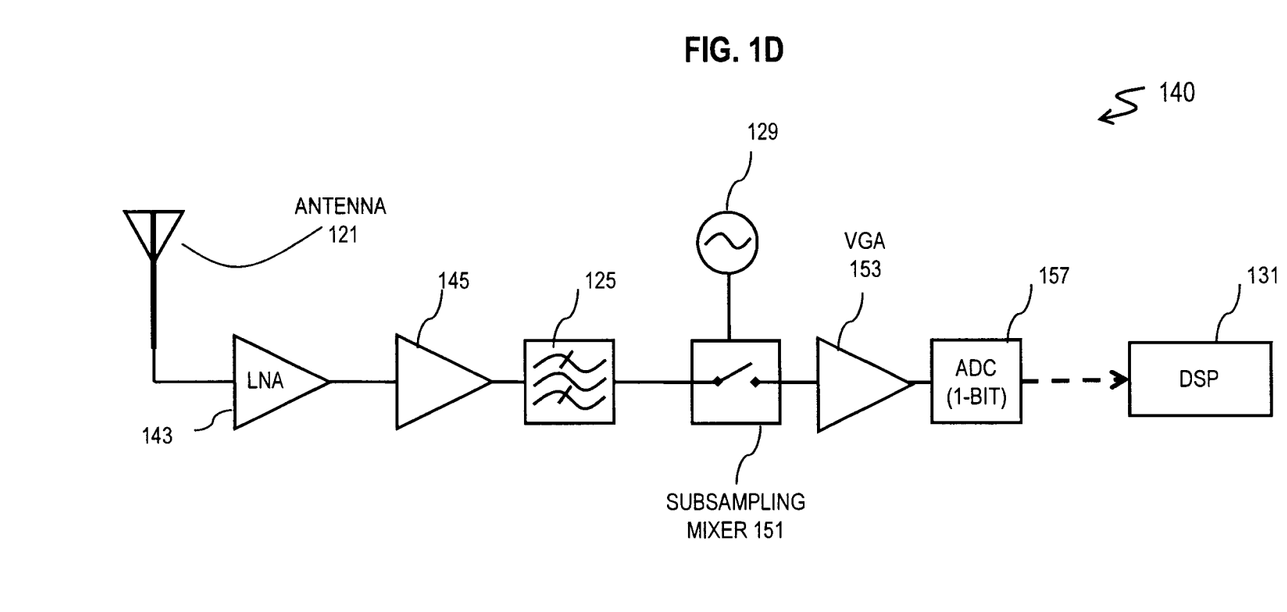
FIG. 1D is a diagram of a receiver for implementation on a chip in a GNSS application, according to an experimental embodiment.

FIG. 1D is a diagram of a receiver 140 for implementation on a chip in a GNSS application, according to an experimental embodiment. The experimental embodiment includes an antenna 121, Q-enhanced filter 125, sampling clock 129 and DSP 131 as described above, as well as a LNA 143 and amplifier 145. However, in the experimental embodiment, the sample and hold ADC 127 is replaced by a configuration in which there is a separate sample and hold stage called a sub-sampling mixer 151 in series with a variable gain amplifier (VGA) 153 and one bit comparators called a 1-bit ADC 157. Most ADCs have a sample and hold stage that samples the actual signal followed by a number of comparators to compare the sampled signal with a reference signal. The outputs of the comparators comprise the digital signal. In the experimental embodiment, the VGA 153 is disposed between a separate sample and hold stage (sub-sampling mixer 151) and the comparators of the 1-bit ADC 157. This change slightly improved measured performance of the receiver. For a supply voltage of 1.2 V, LNA power consumption was measured to be 4.1 mW, Q-enhance filter power consumption was measured to be 1.6 mW and total power consumption, including test circuitry, was measured to be 8.7 mW, well within desirable ranges. The LNA gain was 25 dB with a Noise Figure measured to be 2.9 dB. The gain of the VGA was variable up to 50 dB. At the GPS L1 carrier frequency of 1.57542 GHz, the filter gain was 25 dB.

Figure 2:
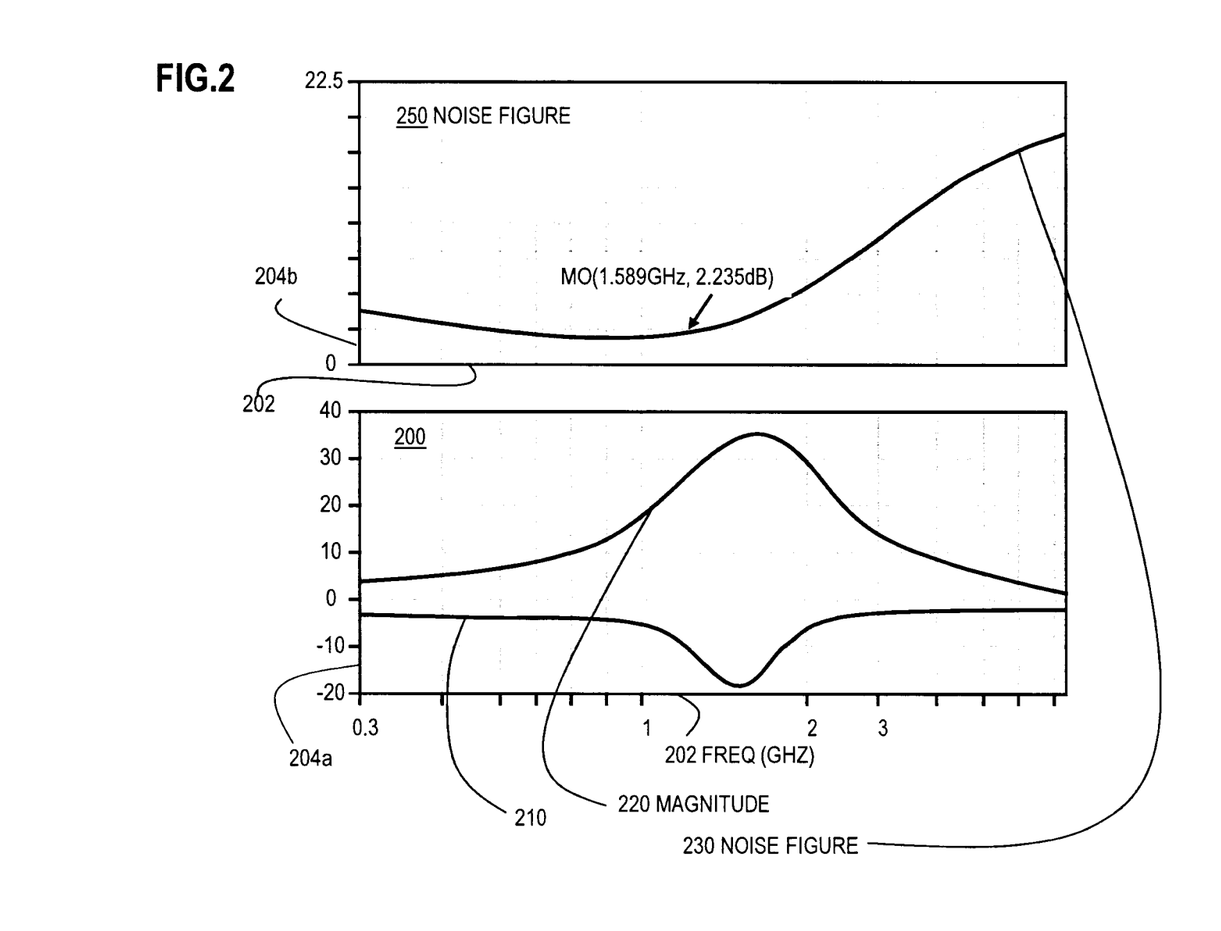
FIG. 2 is a pair of graphs of response and noise figure, respectively, for a low noise amplifier (LNA) component, according to one embodiment.

FIG. 2 is a pair of graphs 200 and 250 of response and noise figure, respectively, for a low noise amplifier (LNA) component, according to one embodiment. The horizontal axis 202 is frequency in GHz for both graphs. The vertical axis 204a is amplitude in deciBels (dB) and vertical axis 204b is an expanded amplitude also in dB. The top graph 250 shows a trace 230 of the Noise Figure of the LNA in dB as a function of frequency. In the lower graph 200, the trace 220 shows the magnitude response of the LNA as a function of frequency, with a pass band from about 1 GHz to about 2.5 GHz. The trace 210 shows the scattering parameter S11 as a function of frequency. The S11 parameter indicates the input port voltage reflection of the LNA, and trace 210 shows that the reflection is minimal in the pass band.

Figure 3:
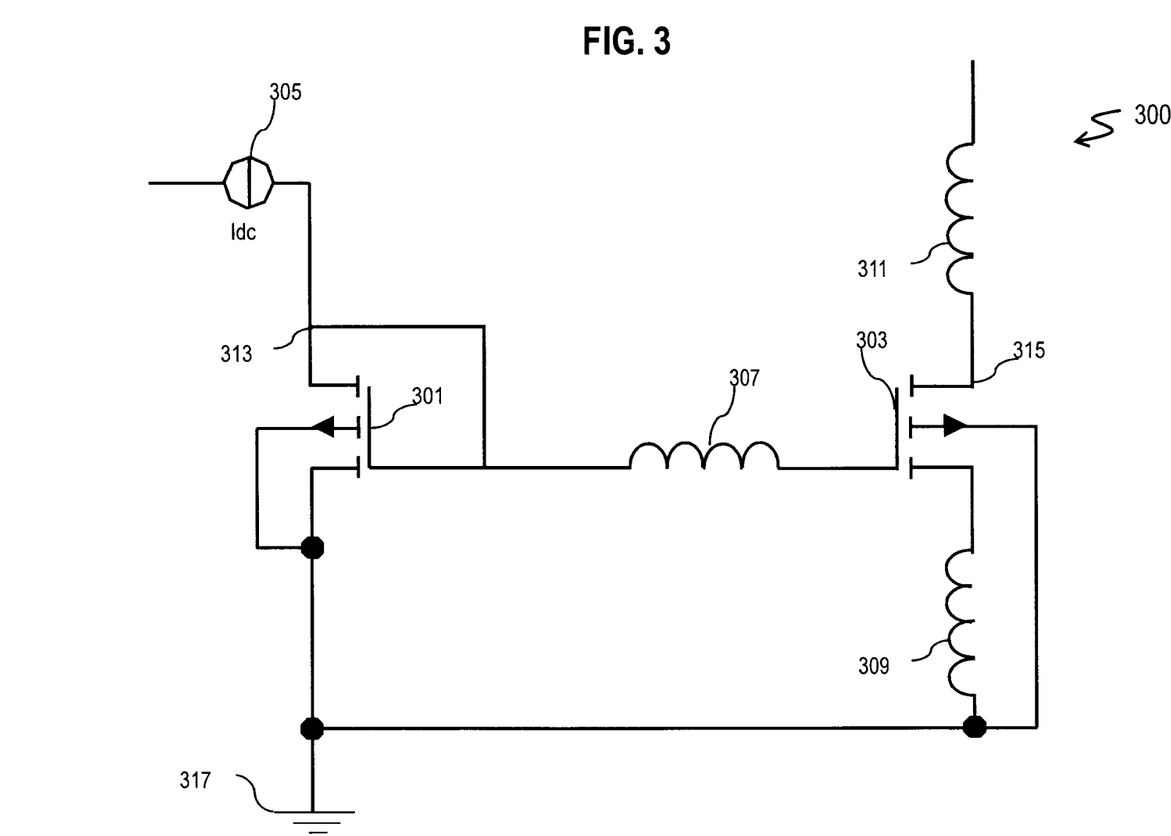
FIG. 3 is a circuit diagram for a portion of a low noise amplifier (LNA), according to one embodiment.

FIG. 3 is a circuit diagram 300 for a portion of a low noise amplifier (LNA), according to one embodiment. LNA is an example embodiment of LNA 173 or LNA 143 or each LNA in the LNA stage 123. The LNA portion 300 comprises two CMOS transistors 301 and 303. Size and value of CMOS components may vary according to desired performance. The body of each of the transistors is connected to the most negative voltage of the chip. The transistor 301 and the current source 305 constitute a bias circuit to bias the transistor 303. In the illustrated embodiment, the current source 305 is a transconductance (gm) controlled reference implemented to control the gm of the LNA 300 with an external resistor. Therefore, the transconductance of the LNA 300 can be set relatively independently of temperature and process variations. The value of inductors 307 and 309 as well as the size of transistors 301 and 303 are determined in an optimization procedure as described later. The inductor 311 represents the load from the next stage of the GNSS receiver. The next stage can be another LNA or a Q-enhanced amplifier. The input to the LNA 300 is applied at node 313 and the output is measured at node 315 relative to electrical ground 317. In an example embodiment, the LNA 173 or 143 or 123 is actually implemented as a differential LNA. The differential LNA is fully symmetric, so only a half-circuit is shown in FIG. 3. Thus the actual LNA has two outputs 315 that connect to the Q-enhanced filter via a CMOS transistor, as depicted in FIG. 4, described below.

The LNA (e.g., 103) sets the Noise Figure (NF) of the system if the gain of the LNA 103 is sufficiently high. The gain of the LNA 103 plus the gain of the subsequent Q-Enhanced Bandpass filter 107 are preferably high enough so that noise introduced by the sub-sampling process remains below the thermal noise floor. According to DeVries, C., et al. "Sub-sampling Architecture for Low Power Receivers". IEEE Transactions on Circuits and Systems, vol. 55, no.4, pp. 304-308. April 2008, a sub-sampling frequency of 16*1.023 MHz and a sampling capacitance of 0.3 pF of the sample and hold stage serving as ADC 179 results in a Noise Figure (NF) greater that 40 dB. A sample and hold stage to serve as ADC 179 is described in more detail below with reference to FIG. 6. Thus, the combined gain of the LNA 173 and the Q-Enhanced Bandpass filter 175 is desirably higher than 40 dB so that the combination does not perturb the noise figure initially set by the LNA 173. The LNA 300 was optimized using the design procedure outlined in Shaeffer, D. K., et al "A 1.5-V, 1.5-GHz CMOS low noise amplifier". IEEE Journal of Solid States Circuits, vol. 32, no. 5, pp. 745-759. May 1997. In some embodiments, a simulated Noise Figure of 2.3 dB was achieved while consuming approximately 8 mW of power. In another embodiment, a simulated LNA 103 had a Noise Figure of less than 1.5 dB with a power consumption of less than 2 mW. In the experimental embodiment 140 of FIG. 1D, the noise figure of the LNA was measured to be 2.9 dB with a measured power consumption of about 4.1 mW.

Figure 4:
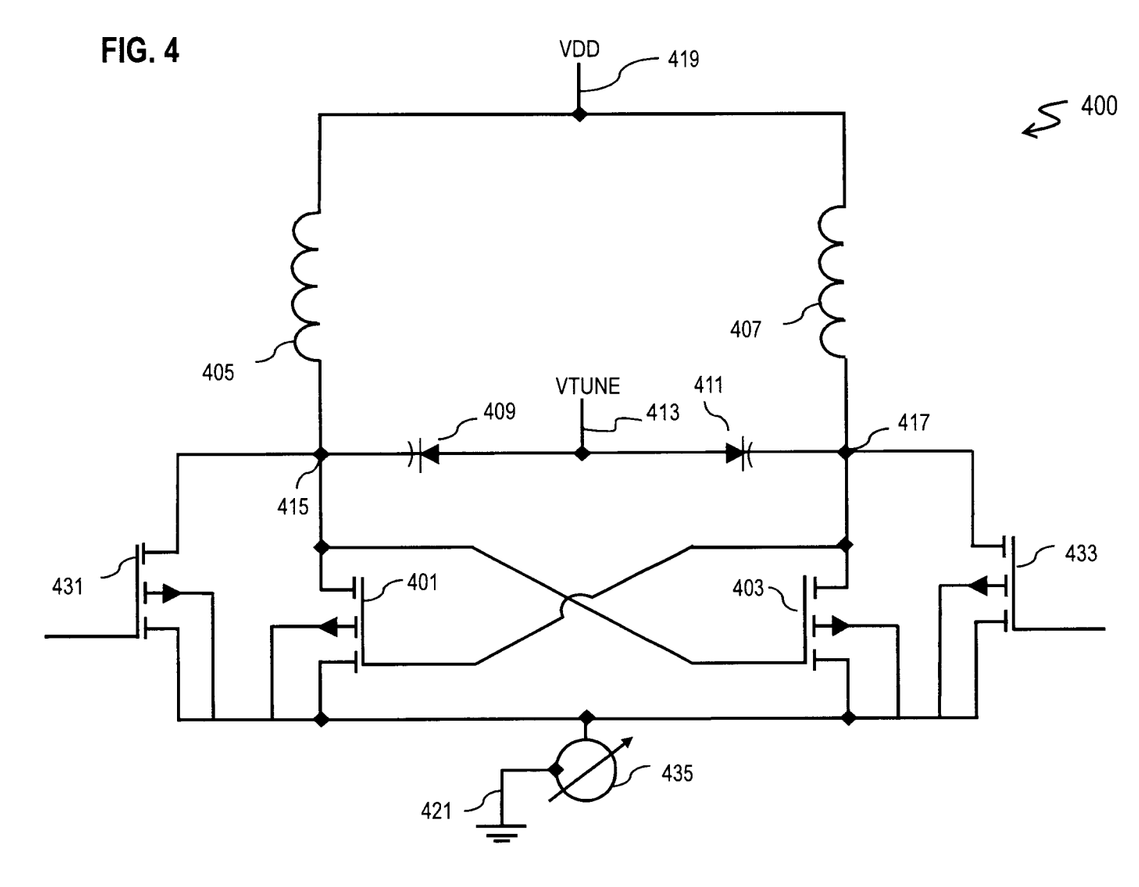
FIG. 4 is a circuit diagram for a Q-enhanced bandpass filter, according to one embodiment.

FIG. 4 is a circuit diagram for a Q-enhanced bandpass filter 400, according to one embodiment. Two transistors 401 and 403 are connected in a cross coupled configuration. A temperature compensating current source 435 delivers current in such a way that it compensates any temperature dependence of transistor 401 and transistor 403. The filter 400 includes spiral inductors 405 and 407. The negative resistance shown by the cross coupled transistors enhances the Q of the inductors 405 and 407. Two MOS variable capacitors (varactors) 409 and 411 are used to tune the resonance frequency of the bandpass filter 400 via a voltage applied to terminal 413. The inputs to this filter are shown as transistors 431 and 433 connected to output 315 of the depicted portion of LAN 300 and to output of a symmetric portion of a differential LNA, respectively. The outputs 415 and 417 of the Q-enhanced BP filter connect directly to sample and hold stage, described below.

The bandwidth of the filter is desirably narrowband to filter out any unwanted noise, which would otherwise alias into the baseband and increase the noise figure of the system to undesired levels, e.g., at frequencies above the Nyquist frequency, which is at half the sampling rate. It is also desirable that the filter is robust against process variations and mismatch. In some embodiments, such as when deployed in Earth orbit, the GPS receiver is operating is a harsh environment where it has to withstand severe daily temperature variations. To achieve such desirable qualities, a compensation circuit is included in the receiver in some embodiments. It is also desirable for the filter 400 to have a broad enough tuning range to process different RF frequencies—such as the L1 and L5 GPS signals. In some embodiments, a summation circuit is added, and several Q-enhanced bandpass filters in parallel process a like number of RF signals. In such embodiments, Q-enhanced filter 107 comprises multiple filters 400 connected in parallel.

Given the low Q of the on-chip spiral inductor elements 405 and 407, achieving a narrowband filter in a standard CMOS RF process was difficult. In other embodiments, the use of Gm-C type filters and enhanced filters are used instead of the negative resistance approach of filter 400 for Q-enhanced bandpass filter 107. The cross coupled configuration filter 400 is a very simple enhanced filter, in which the negative resistance of the cross-coupled transistor pair 401 and 403 is used to enhance the Q of the spiral inductors 405 and 407. This filter topology has a couple of advantages over other filter types. First, the resonance frequency is actually set by two physical passive elements, namely the capacitance from the pair of MOS varactors 409 and 411 and the inductance of the on-Chip spiral inductors 405 and 407. Due to the small temperature coefficient of MOS varactors 409 and 411, the resonance frequency of the filter can be set almost independently of temperature, which allows a very predictable tuning. In an uncompensated filter, temperature and process variations can change the center frequency of the filter by +/−10%. Furthermore, with the Q of the resonant circuit completely dependent on the transconductance of the cross coupled transistor pair 401 and 403, the temperature coefficient of Q is quite well known and a compensation circuit can be implemented. Thus, in some embodiments, a temperature compensation circuit is included, e.g., based on the gm referenced current source 435 that was described above.

The chosen filter 400 allows the tuning of the resonance frequency to be decoupled from the compensation of the Q. The filter achieves a peak with a frequency width, at 3-dB down from the maximum, of 6*1.023 MHz, which, with a sampling frequency fs=16*1.023 MHz, results in a low Noise Figure for the noise folding process of the sub-sampling mixer. According to calculations in DeVries, C., et al. "Sub-sampling Architecture for Low Power Receivers". IEEE Transactions on Circuits and Systems, vol. 55, no. 4, pp. 304-308. April 2008 and MATLAB simulations, the Noise Figure is smaller than 2 dB.

Figure 5:
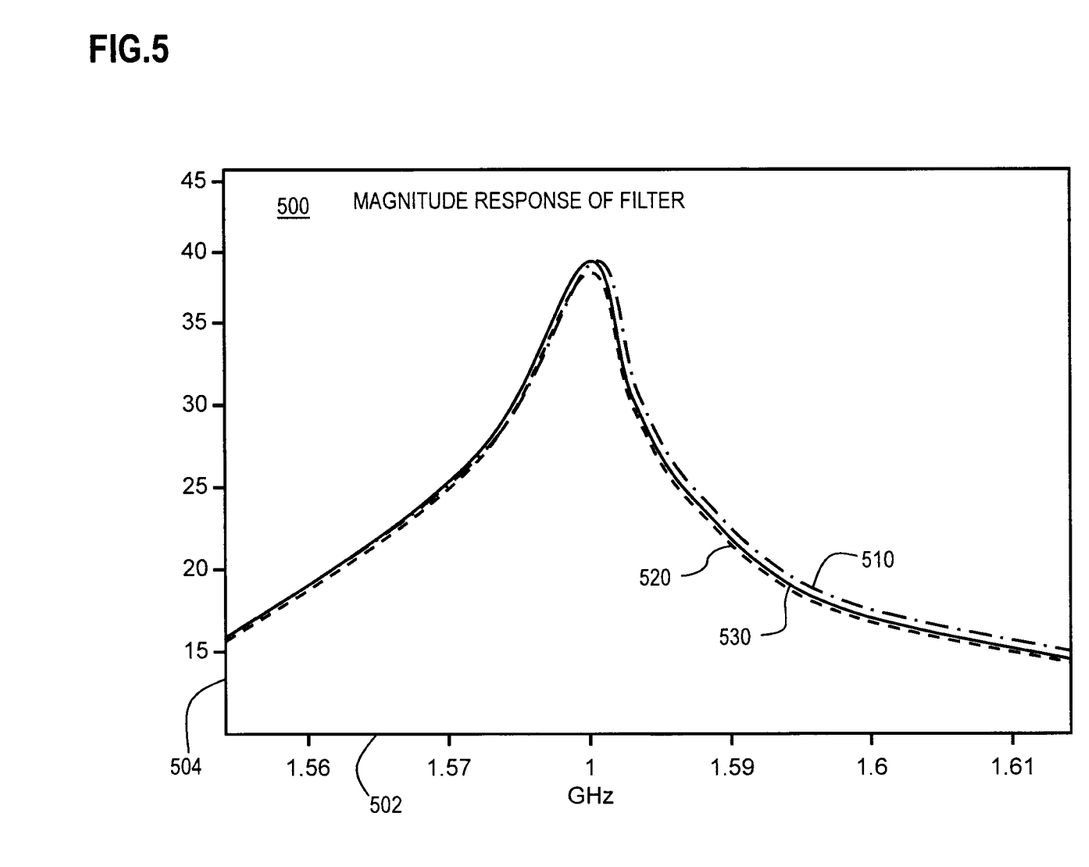
FIG. 5 is a diagram of temperature dependence of magnitude response of the filter of FIG. 4, according to one embodiment.

FIG. 5 is a diagram 500 of temperature dependence of magnitude response of the filter of FIG. 4, according to one embodiment, with a temperature compensating circuit. The horizontal axis 502 is approximate frequency in GHz. The vertical axis 504 is approximate magnitude in arbitrary units. Filter 400 achieved a peak with a frequency width, at 3-dB down from the maximum, of 6*1.023 MHz. The center frequency is about 1 GHz. The traces 510, 520 and 530 illustrate minor temperature dependence of the frequency response at environmental temperatures of −30° C. and 27° C. and 60° C., respectively, which are typical for devices in Earth orbit. As shown, the temperature sensitivity of the frequency response is compensated to a good extent over a large range of temperatures.

Figure 6:
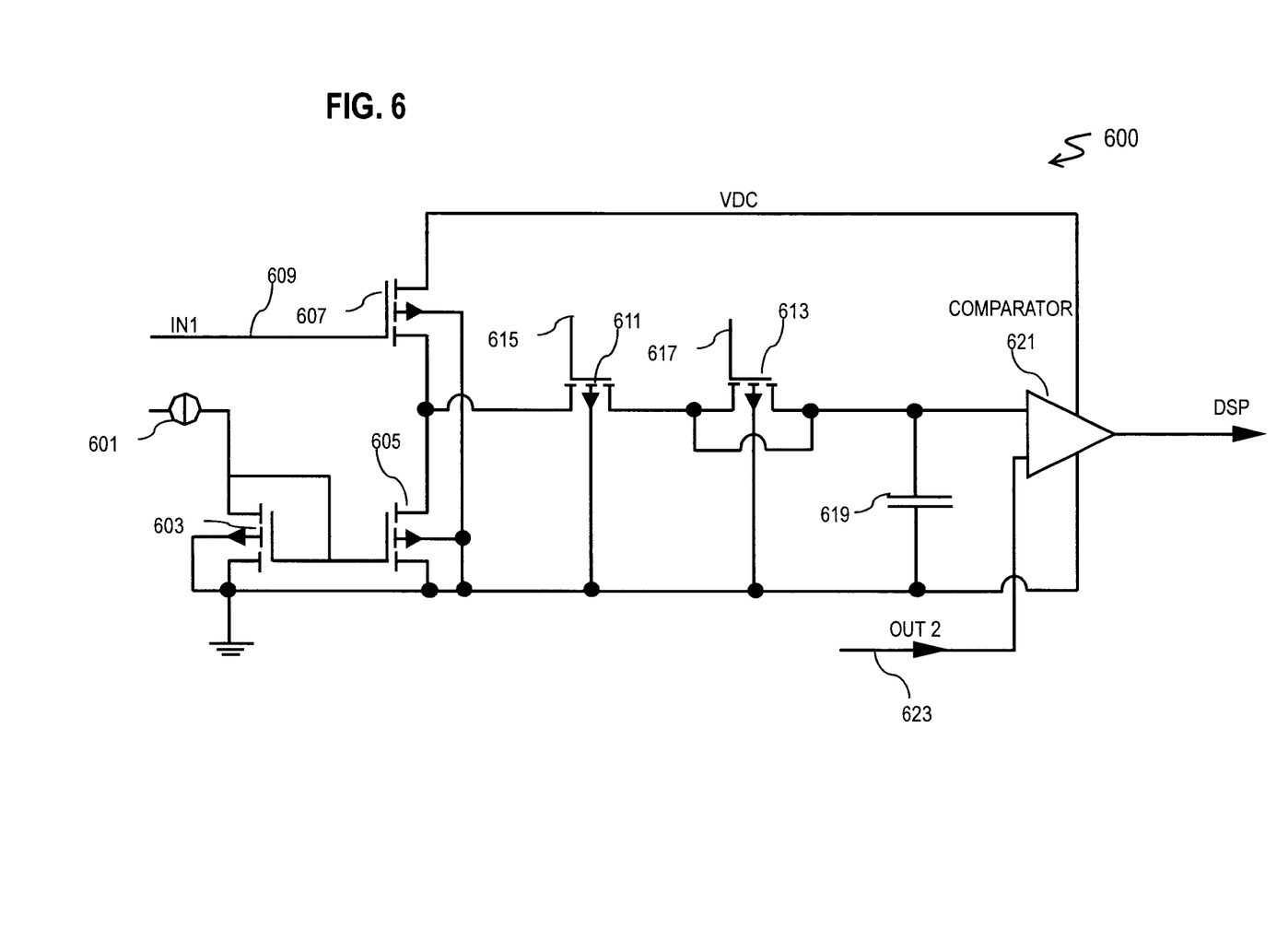
FIG. 6 is a circuit diagram for a portion of a sample and hold (1 bit) analog to digital converter (ADC), according to one embodiment.

FIG. 6 is a circuit diagram 600 for a portion of a sample and hold (1 bit) ADC to serve as ADC 109, according to one embodiment. The current source 601 and the transistors 603 and 605 constitute the biasing circuit for transistor 607. The input to the sample and hold circuit is given through transistor 607 at the transistor's gate terminal 609 relative to electrical ground. In a differential sample and hold stage, a symmetric portion (not shown) is also included. The outputs 415 and 417 of the Q-enhanced filter 400 are connected to the terminal 609 depicted and the symmetric terminal of the differential sample and hold stage (not depicted), respectively. The two transistors 611 and 613 form the sampling module. The clock signals 615 and 617 are given to the transistors 611 and 613, respectively; and are inverse of each other, thus allowing cancelling of the charge that is injected by the sampling switch 613. The capacitor 619 holds the sample current and the comparator 621 performs the 1-bit digital to analog conversion. Terminal 623 of the comparator is used to receive a reference voltage. The output of this sample and hold stage is fed to a DSP module (e.g., DSP 131) for further processing.

The sample and hold circuit 600 is operational at high speeds. Even though the sampling frequency is orders of magnitude smaller than the GPS signal frequency, the incoming gigaHertz RF signal still needs to be tracked with sufficient precision. To achieve the desired tracking speed, commonly used architectures such as bottom plate sampling topologies prove to be insufficient. Instead, the most basic (and therefore fastest) arrangement consisting of a simple switch and capacitor has been employed in circuit 600.

The sample and hold circuit 600 suffers little distortion. Distortions from second order effects such as charge injection and clock feed through are mitigated to avoid any unwanted spurs. In case of GPS, the constraints on distortion are rather undemanding.

Although a particular set of components are described herein for purposes of illustration, in various other embodiments more or fewer components are involved. Furthermore, although components are depicted as particular blocks in a particular arrangement for purposes of illustration, in other embodiments each component, or portions thereof, may be separated or combined or arranged in some other fashion.

What is claimed is:

1. An apparatus comprising:
    a low noise amplifier (LNA) for a radio frequency signal that includes a carrier wave at a carrier wave frequency;
    an analog to digital converter (ADC) for a sampling frequency that is much less than the carrier wave frequency; and
    a Q-enhanced CMOS bandpass filter that substantively blocks frequencies above half the sampling frequency,
    wherein the Q-enhanced CMOS bandpass filter is electrically connected between the low noise amplifier and the ADC without a downconversion module between the low noise amplifier and the ADC.

2. An apparatus as recited in claim 1, wherein the apparatus produces a noise level less than about seven deciBels (dB).

3. An apparatus as recited in claim 1, wherein the Q-enhanced CMOS bandpass filter further comprises:
    an inductor spiral on an integrated circuit;
    a capacitor in parallel with the inductor spiral; and
    a negative resistance circuit disposed in parallel with the spiral inductor and capacitor.

4. An apparatus as recited in claim 3, wherein the negative resistance circuit further comprises a cross-coupled pair of transistors.

5. An apparatus as recited in claim 4, further comprising a limiting amplifier configured to compensate for temperature dependence of the pair of transistors.

6. An apparatus as recited in claim 1, wherein the ADC is a one bit ADC.

7. An apparatus as recited in claim 6, wherein the ADC comprises a sampling switch and a second switch that is configured to cancel charge injection by the sampling switch.

8. An apparatus as recited in claim 1, wherein the ADC is configured to sample up to about 250 megaHertz (MHz).

9. An apparatus as recited in claim 1, wherein the LNA is configured to provide a gain of more than about 30 deciBels (dB) and a noise figure less than about 3 dB.

10. An apparatus as recited in claim 1, wherein the LNA is configured to operate on about eight (8) milliWatts (mW) of power.

11. An apparatus as recited in claim 1, wherein the Q-enhanced bandpass filter is configured to provide a full width at −3 dB of 6*1.023 mega Hertz (MHz).

12. An apparatus as recited in claim 11, wherein the ADC is configured to sample at 16*1.023 MHz.

13. A method comprising:
    filtering a first radio frequency signal with a Q-enhanced CMOS bandpass filter that substantively blocks frequencies above half a sampling frequency; and
    sampling a second radio frequency signal based on a filtered signal output by the Q-enhanced CMOS bandpass filter at or near the sampling frequency,
    wherein the first radio frequency signal includes a carrier wave frequency that is many times greater than the sampling frequency.

14. A method as recited in claim 13, further comprising amplifying a received radio frequency signal with a low noise amplifier (LNA) to produce the first radio frequency signal.

15. A method as recited in claim 13, further comprising amplifying the filtered signal output by the Q-enhanced CMOS bandpass filter to produce the second radio frequency signal.

16. A method as recited in claim 13, wherein a sampled signal based on the second radio frequency signal has a noise figure of less than about 3 deciBels (dB).

17. An apparatus comprising:
   means for filtering a first radio frequency signal with a Q-enhanced CMOS bandpass filter that substantively blocks frequencies above half a sampling frequency; and
   means for sampling a second radio frequency signal based on a filtered signal output by the Q-enhanced CMOS bandpass filter at or near the sampling frequency,
   wherein the first radio frequency signal includes a carrier wave frequency that is many times greater than the sampling frequency.

18. An apparatus as recited in claim 17, further comprising means for amplifying a received radio frequency signal with a low noise amplifier (LNA) to produce the first radio frequency signal.

19. An apparatus as recited in claim 17, further comprising means for amplifying the filtered signal output by the Q-enhanced CMOS bandpass filter to produce the second radio frequency signal.

20. An apparatus as recited in claim 17, wherein a sampled signal based on the second radio frequency signal has a noise figure of less than about 3 deciBels (dB).

* * * * *